(12) United States Patent
Minato et al.

(10) Patent No.: US 11,469,966 B2
(45) Date of Patent: Oct. 11, 2022

(54) TRANSMISSION SYSTEM, DEVICE MANAGEMENT SERVER, FAULT MANAGEMENT METHOD, AND PROGRAM

(71) Applicant: Nippon Telegraph and Telephone Corporation, Tokyo (JP)

(72) Inventors: Yuji Minato, Musashino (JP); Masahiro Yokota, Musashino (JP); Masatoshi Namiki, Musashino (JP); Masaaki Inami, Musashino (JP); Daisaku Shimazaki, Musashino (JP); Hideki Maeda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/256,916

(22) PCT Filed: Jul. 3, 2019

(86) PCT No.: PCT/JP2019/026491
§ 371 (c)(1),
(2) Date: Dec. 29, 2020

(87) PCT Pub. No.: WO2020/013056
PCT Pub. Date: Jan. 16, 2020

(65) Prior Publication Data
US 2021/0281489 A1 Sep. 9, 2021

(30) Foreign Application Priority Data
Jul. 9, 2018 (JP) .............................. JP2018-130016

(51) Int. Cl.
*H04L 12/24* (2006.01)
*H04L 41/12* (2022.01)
(Continued)

(52) U.S. Cl.
CPC ............ *H04L 41/12* (2013.01); *H04L 41/024* (2013.01); *H04L 41/0893* (2013.01);
(Continued)

(58) Field of Classification Search
CPC ..... H04L 41/12; H04L 41/0893; H04L 41/14; H04L 41/0856; H04L 43/0817;
(Continued)

(56) References Cited

U.S. PATENT DOCUMENTS

2003/0154144 A1* 8/2003 Pokorny ............ G05B 13/0285
705/28
2007/0288306 A1* 12/2007 Oh ......................... G06Q 10/06
700/95
(Continued)

FOREIGN PATENT DOCUMENTS

| JP | 2005-235078 | 9/2005 | |
| JP | 2012190302 A * | 4/2012 | ............ G06Q 50/04 |
| JP | 2012-190302 | 10/2012 | |

OTHER PUBLICATIONS

Foreign Patent JP 2012190302A, Author: Koichi et al. (Year: 2012).*

*Primary Examiner* — Tonia L Dollinger
*Assistant Examiner* — Mehulkumar J Shah
(74) *Attorney, Agent, or Firm* — Fish & Richardson P.C.

(57) ABSTRACT

[Problem] A transmission system, an apparatus management server, a failure management method, and a program enabling the cause of a failure associated with a silent change of an article to be swiftly identified are provided.
[Solution] An apparatus management server 100 of a transmission system includes a collection unit configured to collect history information on an introduction instance of articles to an optical transmission apparatus 10 and an information analysis unit 130 configured to visualize and display, based on the history information collected, a graph
(Continued)

in which a starting date of use for each of the articles is associated with the number of introductions of the article.

7 Claims, 5 Drawing Sheets

(51) Int. Cl.
*H04L 41/0893* (2022.01)
*H04L 41/14* (2022.01)
*H04L 41/02* (2022.01)
*H04L 43/0817* (2022.01)
*H04L 43/045* (2022.01)

(52) U.S. Cl.
CPC .......... *H04L 41/14* (2013.01); *H04L 43/0817* (2013.01); *H04L 43/045* (2013.01)

(58) Field of Classification Search
CPC ..... H04L 41/024; H04L 43/045; H04L 12/24; H04L 41/02; H04L 41/085; G06F 13/00
USPC .......................................... 709/223
See application file for complete search history.

(56) References Cited

U.S. PATENT DOCUMENTS

| | | | |
|---|---|---|---|
| 2013/0007262 A1* | 1/2013 | Akatoki .................. | G06F 11/32 709/224 |
| 2020/0013134 A1* | 1/2020 | Nagasawa .............. | G06Q 50/28 |

* cited by examiner

| APPARATUS NAME | PKG TYPE | STARTING DATE OF USE | INVENTORY |
|---|---|---|---|
| APPARATUS α | PKG TYPE [A] | 2015/3/1 | 00001 |
| APPARATUS β | PKG TYPE [A] | 2015/3/1 | 00001 |
| APPARATUS γ | PKG TYPE [A] | 2017/3/5 | 00011 |
| APPARATUS δ | PKG TYPE [A] | 2017/3/5 | 00011 |

TRANSMISSION SYSTEM, DEVICE MANAGEMENT SERVER, FAULT MANAGEMENT METHOD, AND PROGRAM

CROSS-REFERENCE TO RELATED APPLICATIONS

This application is a National Stage application under 35 U.S.C. § 371 of International Application No. PCT/JP2019/026491, having an International Filing Date of Jul. 3, 2019, which claims priority to Japanese Application Serial No. 2018-130016, filed on Jul. 9, 2018. The disclosure of the prior application is considered part of the disclosure of this application, and is incorporated in its entirety into this application.

TECHNICAL FIELD

The present disclosure relates to a transmission system, an apparatus management server, a failure management method, and a program.

BACKGROUND ART

Various devices are connected to a network system including a transmission system. However, inventory information about the devices may not be disclosed to a network carrier in some cases.

If inventory information about devices is disclosed to the network carrier, a change in a component of a device can be recognized based on a difference. Unfortunately, there are cases where the inventory information about some devices are only recognized by their vendors, the checking method of which may also not be disclosed. In such a case, a change in a component cannot be recognized on the carrier side.

This means that a component of a device may be changed while being unrecognizable on the carrier side (silent change). For example, the following technique is available for detecting the silent change.

Patent Literature 1 discloses "a method of disclosing change history information about a component, the method comprising: generating a change history of information about a component based on input information about a change in the component at the time of component change; setting whether the information about the change history generated by the generating is disclosed for each change of the component based on information about the component change; and setting a disclosed content stored in a database to be disclosed".

Patent Literature 2 discloses "a component information management system comprising: a basic component information database configured to store for each type of product, basic component information indicating a component part defining in a setting stage; a component change information database configured to store component change information indicating a history of a change of a component part performed for each of a plurality of the produces, in association with the basic component information; a processing unit configured to acquire from the basic component information database and the component change information database, the basic component information and the component change information about a designated product, and outputs the component part of the product as a component part list; and a display unit configured to display the output from the processing unit".

CITATION LIST

Patent Literature

Patent Literature 1: JP 2005-235078 A (Claim 1)
Patent Literature 1: JP 2012-190302 A (Claim 1)

SUMMARY OF THE INVENTION

Technical Problem

With the techniques disclosed in Patent Literatures 1 and 2, a silent change can be found. However, a difference between a normal article and a failed article cannot be easily detected, and in reality it takes a lot of time to find a silent change. Thus, there is a problem in that when a silent change is made, identification of the cause of an occurrence of a malfunction attributed to the changed component takes a long period of time and a commercial service may be largely affected.

The present disclosure has been made in view of this background, and an object of some aspects of the present disclosure is to provide a transmission system, an apparatus management server, a failure management method, and a program enabling a cause of a failure associated with a silent change of an article to be swiftly identified.

Means for Solving the Problem

To solve the problem described above, according to aspect 1, provided is a transmission system including an apparatus management server configured to manage information about a plurality of articles forming a transmission apparatus, wherein the apparatus management server includes a collection unit configured to collect history information on an introduction instance of the articles to the transmission apparatus, and a visualization unit configured to visualize and display, based on the history information collected, a graph in which a starting date of use for each of the articles is associated with a number of introductions of the article.

According to aspect 4, provided is an apparatus management server configured to manage information about a plurality of articles forming a transmission apparatus, the apparatus management server including: a collection unit configured to collect history information on an introduction instance of the articles to the transmission apparatus; and a visualization unit configured to visualize and display, based on the history information collected, a graph in which a starting date of use for each of the articles is associated with a number of introductions of the article.

According to aspect 5, provided is a failure management method for an apparatus management server configured to manage information about a plurality of articles forming a transmission apparatus, the method including: collecting, by the apparatus management server, history information on an introduction instance of the articles to the transmission apparatus, and visualizing and displaying, by the apparatus management server, based on the history information collected, a graph in which a starting date of use for each of the articles is associated with a number of introductions of the article.

According to aspect 6, provided is a program causing a computer as an apparatus management server of a transmission system, the apparatus management server configured to manage information about a plurality of articles forming a transmission apparatus, to function as a collection unit configured to collect history information on an introduction instance of the articles to the transmission apparatus, and a visualization unit configured to visualize and display, based on the history information collected, a graph in which a starting date of use for each of the articles is associated with a number of introductions of the article.

According to some aspects of the present disclosure, a graph in which the starting date of use for each of the articles of the transmission apparatus is associated with the number of introductions of the article can be visualized. Such a graph of the number of introductions of the article with the starting date of use being the starting point enables an article to be correlated with the occurrence of failure associated with a silent change, so that the occurrence of the failure of the article associated with the silent change can be confirmed on the graph. Thus, on the carrier side, for example, information indicating the cause of failure can be collected for early identification of the cause of a failure associated with a silent change of an article. As a result, the cause of a failure associated with a silent change of an article that has occurred can be quickly identified. The time required for identifying the cause after the identification of the failed portion is considerably reduced, whereby the influence on the commercial service can be reduced especially when multiple failures associated with a silent change of the article occur.

According to aspect 2, provided is the transmission system as in aspect 1, wherein the number of introductions of the article includes cumulative number of introductions of the article.

With this configuration, the number of introductions is expressed as the cumulative number of introductions on the graph, so that the level of influence (range of influence) over an occurrence of a failure associated with a silent change in an article can be indicated. With the level of influence (range of influence) indicated, more effective countermeasures can be taken (such as responding quickly to or establishing a stronger support system for a higher level of influence).

According to aspect 3, provided is the transmission system as in aspect 1, wherein the transmission apparatus holds, as the history information, article information, starting information of use, and inventory used by the transmission apparatus, and the transmission apparatus transmits the history information to the apparatus management server in response to a request from the apparatus management server.

This allows, on the apparatus management server side, the configuration for collecting the history information to be simplified. With the configuration of the apparatus management server simplified, the system can be established using a general purpose servy, whereby cost reduction can be achieved.

Effects of the Invention

The present disclosure can provide a transmission system, an apparatus management server, a failure management method, and a program enabling the cause of a failure associated with a silent change in an article to be swiftly identified.

DESCRIPTION OF EMBODIMENTS

Hereinafter, a transmission system according to an embodiment of the present disclosure (hereinafter referred to as "the embodiment") will be described with reference to the drawings.

Comparative Example

Figure 7:
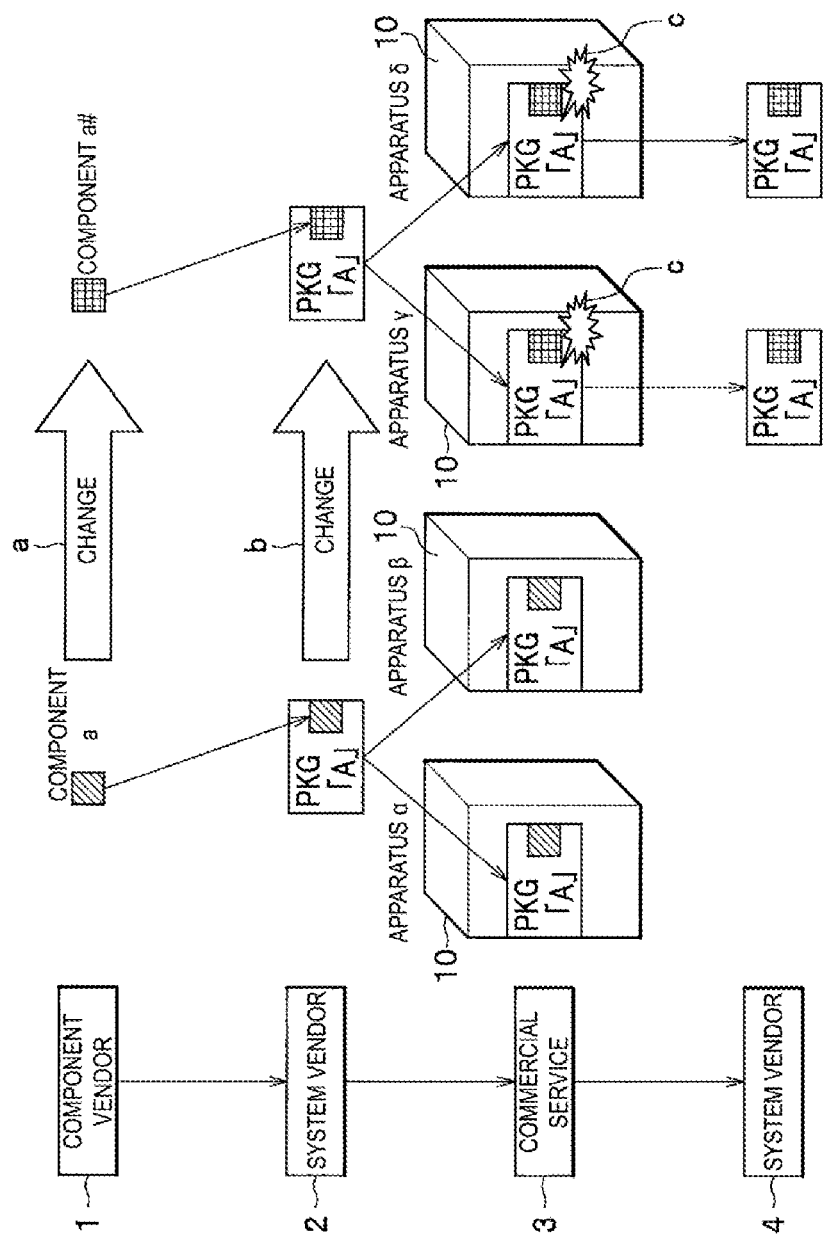
FIG. 7 is a diagram illustrating a silent change in a transmission system according to Comparative Example.

FIG. 7 is a diagram illustrating a silent change in a transmission system according to Comparative Example.
As illustrated in FIG. 7, as a component distributor (hereinafter, the distributor is referred to as a vendor), vendor 1 distributes a "component a".
A system vendor 2 purchases the component a from the component vendor 1 and combines the component a with other components to produce a package (PKG) of a specific functional component, and distributes the PKG. The package (PKG) distributed by this system vendor 2 is referred to as a PKG "A".

As a commercial service company (hereinafter referred to as a commercial service), a commercial service 3 is a carrier (telecommunications carrier) that establishes a transmission system using transmission apparatuses 10 including the PKG "A", to provide telecommunication services. The transmission apparatus 10 is, for example, an optical transmission apparatus that optically transmits information and/or data using, and the PKG "A" is an optical module. Hereinafter, the apparatus (optical transmission apparatus) 10 provided by the commercial service 3 are referred to as a transmission apparatus 10α, a transmission apparatus 10β, a transmission apparatus 10γ, and a transmission apparatus 10δ.

Note that, the transmission apparatus 10α, the transmission apparatus 10β, the transmission apparatus 10γ, and the transmission apparatus 10δ are collectively referred to as the transmission apparatus 10, when they are not distinguished from each other.

The system vendor 4 provides software and services for the commercial service 3 to operate the transmission system.

A problem associated with a silent change in Comparative Example illustrated in FIG. 7 will be described.
As indicated by a reference numeral a in FIG. 7, the component vendor 1 changes the component a to a component a #. Popular reasons for changing components include difficulty in procuring the raw material and cost reduction. The component a # is determined to have passed a shipping inspection performed by the component vendor 1 because the change is within a specification value of the component a. Note that for the change to component a #, it is a silent change from the perspective of the system vendor 2 or later.

As indicated by the reference numeral b in FIG. 7, in the system vendor 2, the PKG "A" including the component a is changed to the PKG "A" including the component a #, because the component a has been changed to the a # by the component vendor 1. The PKG "A" including the component a # is determined to have passed the shipping inspection by the system vendor 2. Note that the component a # is a result of the silent change, and thus passing the shipping inspection test does not mean that it is free of failure to exert the identical function as the component a due to a change in the environment over time after the change, a use mode, and the like.

The commercial service 3 (carrier) provides telecommunication services using the plurality of transmission apparatuses 10. As indicated by the reference numeral c in FIG. 7, multiple failures associated with the change within the specification value of the component (change from the component a to the component a #) occur. The commercial service 3 (carrier) is unaware of the change of the article, and thus cannot detect a difference between the normal article and the failed article.

In Comparative Example, for a component introduced to the commercial service 3 (carrier), when a failure (malfunction) associated with the silent change of an article occurs, identification of the cause by the system vendor 4 requires a long period of time and the range of failure of the commercial service 3 expands.

Embodiment

Figure 1:
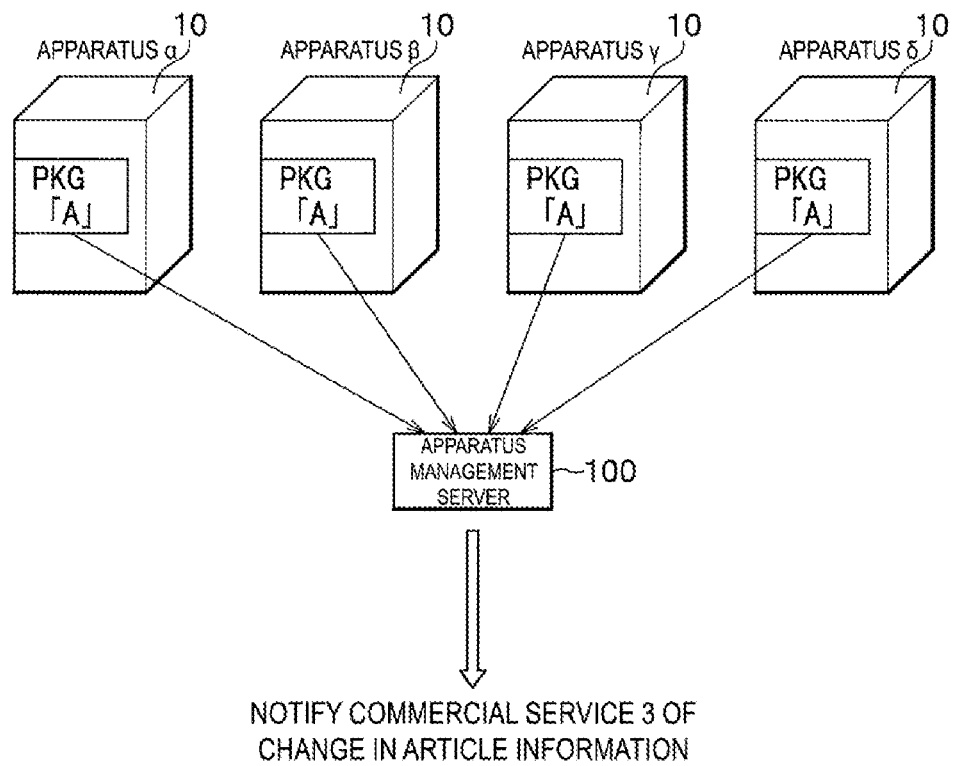
FIG. 1 is a diagram schematically illustrating a transmission system according to an embodiment of the present disclosure.

FIG. 1 is a diagram illustrating an exemplary configuration of a transmission system 1 according to an embodiment of the present disclosure. The identical elements as those in FIG. 7 are denoted by the identical reference numerals.

For example, the transmission system according to an embodiment is an example of the system being applied to an introduction of an optical module of an optical transmission apparatus. The present disclosure can be applied to transmission apparatuses other than optical transmission apparatuses or to electronic devices As illustrated in FIG. 1, the transmission system includes a transmission apparatus 10α, a transmission apparatus 10β, a transmission apparatus 10γ, and a transmission apparatus 10δ including the PKG "A", as well as an apparatus management server 100 that manages information on a plurality of articles forming these transmission apparatuses 10. Note that, the transmission apparatus 10α, the transmission apparatus 10β, the transmission apparatus 10γ, and the transmission apparatus 10δ are collectively referred to as the transmission apparatus 10, when they are not distinguished from each other.

The transmission apparatus 10 is, for example, an optical transmission apparatus, and the PKG "A" is an optical module that is installed in the optical transmission apparatus 10 (in the following description, the transmission apparatus 10 is referred to as the optical transmission apparatus 10).

The apparatus management server 100 is a commercial server that manages the optical transmission apparatuses 10. The apparatus management server 100 may be an orchestrator including management software enabling the system setting and management to be automatically and autonomously performed. When the apparatus management server 100 is configured with a computing apparatus, management of the optical transmission apparatus 10 is operated automatically and autonomously.

The apparatus management server 100 collects history information (article information, starting information of use, inventory) of each article in response to registration of the PKG (here, the optical module) (this will be described later).

Inventory information corresponds to "a list of hardware information and software information". In the embodiment, the number (identification information) of the article in the inventory information is referred to as "inventory."

The apparatus management server 100 notifies the commercial service 3 (carrier) (see FIG. 7) of a change in article information (described later).

Figures 2, 3:
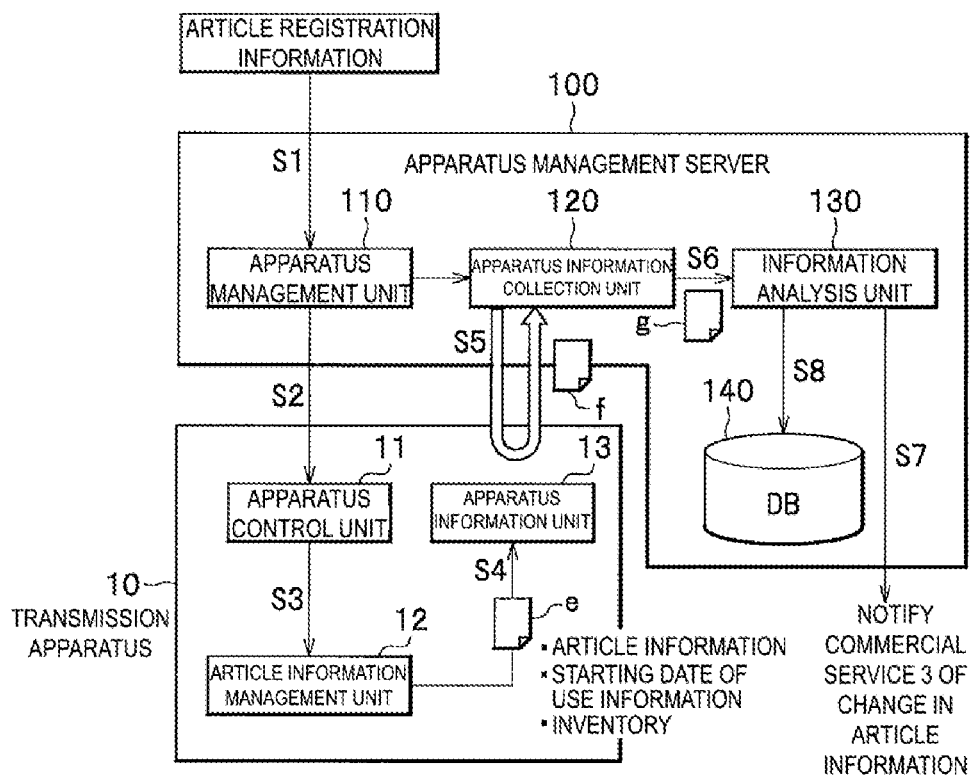
FIG. 2 is a block diagram illustrating a configuration of an apparatus management server and a transmission apparatus in the transmission system according to the above embodiment.
FIG. 3 is a diagram illustrating an example of a record of history information (article information, starting information of use, and inventory information) stored in a DB of the apparatus management server of the transmission system according to the above embodiment.

FIG. 2 is a block diagram illustrating a configuration of the apparatus management server 100 and the optical transmission apparatus 10 in the transmission system according to an embodiment of the present disclosure.

As illustrated in FIG. 2, the apparatus management server 100 includes an apparatus management unit 110, an apparatus information collection unit 120, an information analysis unit 130, and a database (DB) 140.

The apparatus management unit 110 receives article registration information from the outside and acquires article name information and storage location information based on the article registration information.

The apparatus information collection unit 120 outputs to the information analysis unit 130, history information (article information, starting date of use information, inventory) collected from an apparatus information unit 13 of the optical transmission apparatus 10.

The information analysis unit 130 analyzes the history information (article information, starting date of use information, and inventory) collected by the apparatus information collection unit 120, to monitor a change in the history information.

The information analysis unit 130 outputs the article information, the starting information of use, and the inventory to DB 140, to update the DB 140. The information analysis unit 130 notifies the commercial service 3 (carrier) (see FIG. 7) of a change in the article information.

The database (DB) 140 stores information collected by the apparatus information collection unit 120 (article information, starting information of use, and inventory).

Here, the apparatus management unit 110, the apparatus information collection unit 120, and the DB 140 collectively have functions as a collection unit that collects history information on an introduction instance of an article to the optical transmission apparatus 10. In addition, the information analysis unit 130 has a function to serve as a visualization unit for visualizing and displaying a graph in which the starting date of use for each article is associated with the number of introductions of the article based on the history information collected.

The optical transmission apparatus 10 includes an apparatus control unit 11, an article information management unit 12, and the apparatus information unit 13.

The apparatus control unit 11 controls the entire optical transmission apparatus 10 and acquires the article name information and the storage location information transmitted from the apparatus management unit 110 of the apparatus management server 100.

Based on the article name information and the storage location information acquired from the apparatus management unit 110, the article information management unit 12 outputs history information (article information, starting date of use information, and inventory) to the apparatus information unit 13 in response to the insertion of the article.

In response to a request from the apparatus management server 100, the apparatus information unit 13 transmits the article information, the starting date of use information, and the inventory collected by the apparatus information unit 13.

FIG. 3 is a diagram illustrating an example of records of history information (article information, starting information of use, and inventory) stored in the DB 140 of the apparatus management server 100. The figure illustrates an example corresponding to the case of the transmission system illustrated in FIG. 1.

As illustrated in FIG. 3, the DB 140 stores the article information including apparatus name, PKG type, starting date of use, and inventory.

The apparatus name includes an apparatus α, an apparatus β, an apparatus γ, an apparatus δ, and so on.

The PKG type includes PKG type "A" indicating the PKG "A" (optical module).

The starting date of use is a date of insertion (installation) of the PKG "A" (optical module) into the body. For example, the starting date of use of the PKG "A" of the apparatus α and apparatus β is "2015/3/1", and the starting date of use of the PKG "A" of the apparatus γ and apparatus δ is "2017/3/5" In the present embodiment, the starting date of use is a date of insertion of the PKG. Calculation on the starting date of use is simplified by setting a starting date of use to be the date of insertion of the PKG.

As described above, this inventory indicates the number of the article in the inventory information and is managed using a code. For example, the inventory of PKG "A" of the apparatus α and the apparatus β is "00001", and the inventory of the apparatus γ and the apparatus δ is "00011".

It can be seen in FIG. 3 that the apparatus α, the apparatus β, the apparatus γ, and the apparatus δ have the identical PKG "A" (optical module). Still, the starting date of use and the inventory of the PKG "A" of the apparatus α and the β are respectively "2015/3/1" and "00001". On the other hand, the starting date of use and the inventory of the PKG "A" of the apparatus γ and the δ are respectively "2017/3/5" and "00011".

Hereinafter, a failure management method for the transmission system configured as described above will be described below.

Figure 4:
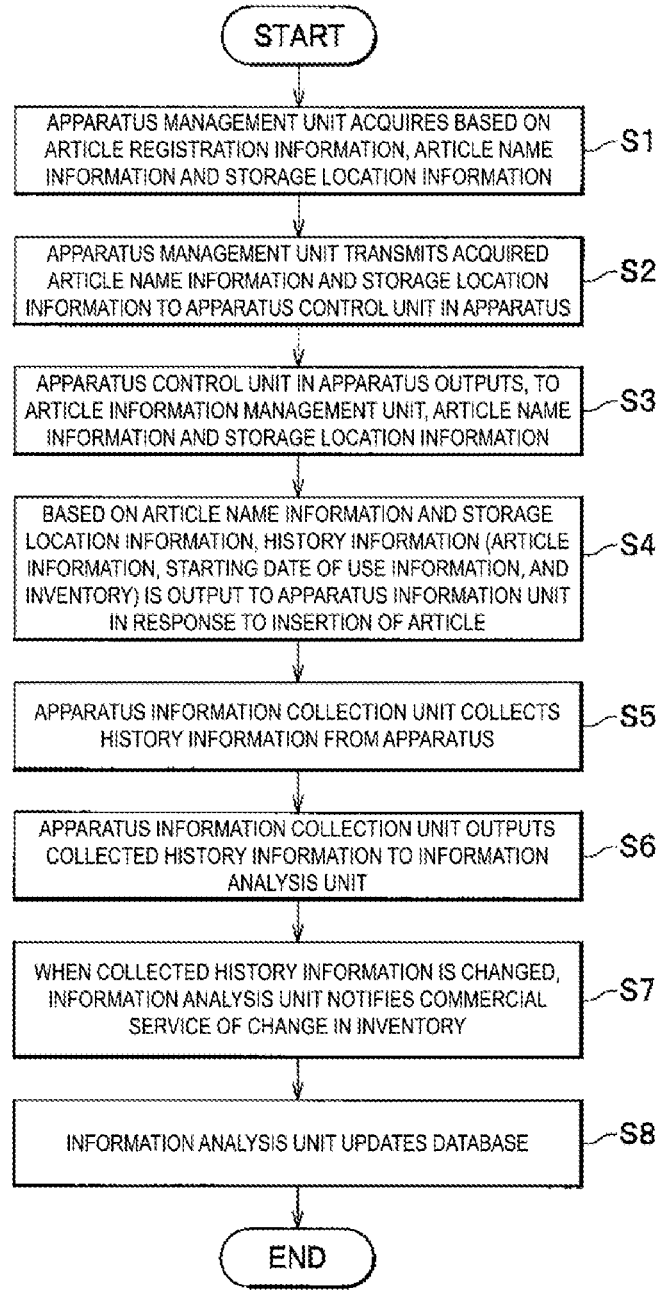
FIG. 4 is a flowchart illustrating a failure management method for the transmission system according to the above embodiment.

FIG. 4 is a flowchart illustrating the failure management method for the transmission system. In the figure, S denotes step number in the flow. The step numbers in FIG. 4 are identical to the step numbers in FIG. 2.

In step S1, the apparatus management unit 110 (see FIG. 2) receives article registration information from the outside and acquires article name information and storage location information based on the article registration information.

In step S2, the apparatus management unit 110 transmits the acquired article name information and the storage location information to the apparatus control unit 11 of the optical transmission apparatus 10 (see FIG. 2), and causes the article name information and the storage location information to be stored in the optical transmission apparatus 10.

In step S3, the apparatus control unit 11 outputs the article name information and the storage location information to the article information management unit 12.

In step S4, based on the article name information and the storage location information acquired, the article information management unit 12 outputs history information (article information, starting date of use information, and inventory) to the apparatus information unit 13 in response to the insertion of the article (see the reference numeral e in FIG. 2).

In step S5, the apparatus information collection unit 120 collects history information (article information, starting date of use information, and inventory) from the optical transmission apparatus 10 (see the reference numeral f in FIG. 2).

In step S6, the apparatus information collection unit 120 outputs to the information analysis unit 130, history information (article information, starting date of use information, and inventory) (see the reference numeral g in FIG. 2).

In step S7, the information analysis unit 130 monitors a change in the history information (article information, starting date of use information, and inventory) collected. When a change occurs in the collected inventory, the information analysis unit 130 notifies the commercial service 3 (see FIG. 7) of the change in the inventory.

In step S8, the information analysis unit 130 updates the DB 140, and terminates the processing of the flow.

EXAMPLES

Figures 5, 6:
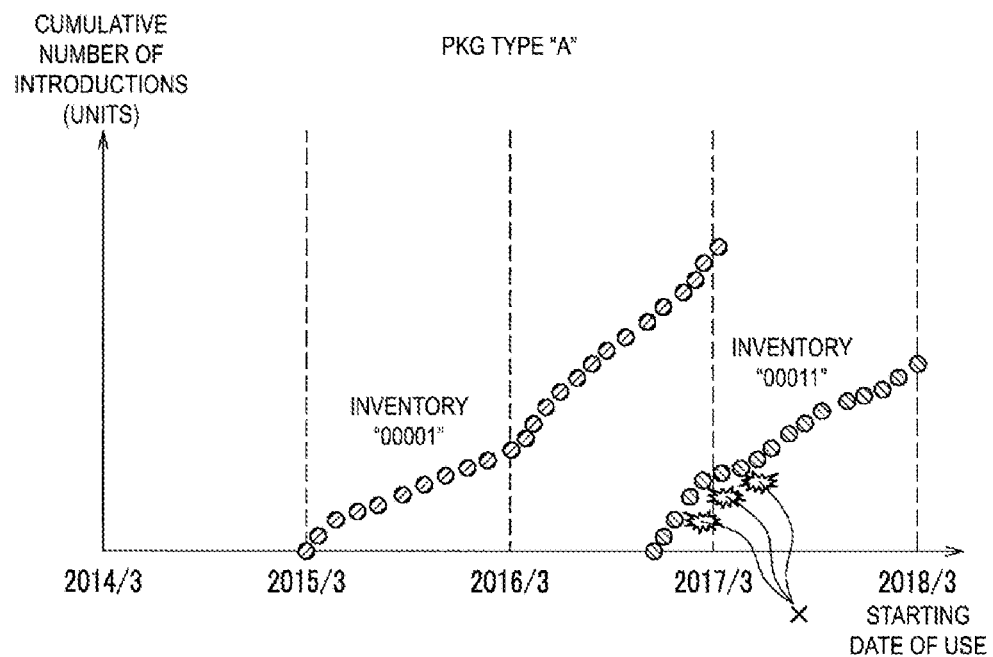
FIG. 5 is a diagram illustrating information collected and stored in the DB by an apparatus information collection unit of the transmission system according to the above embodiment.
FIG. 6 is a graphical illustration of the collected information of FIG. 5.

FIG. 5 is a diagram illustrating information collected and stored in the DB 140 by the apparatus information collection unit 120 (see FIG. 2).

The DB 140 stores the collected information for each PKG type, with a single record including the PKG type, the starting date of use, and the inventory.

The collected information illustrated in FIG. 5 includes PKG "A" (optical module) as the PKG type, "2015/3/1" . . . as the starting date of use, and "00001" . . . as the inventory. Specifically, the PKG type includes information related to the starting date of use and the inventory.

In the example of FIG. 5, the inventory "00001" is the number of an article started to be used on "2015/3/1" (see the reference numeral h in FIG. 5), and the inventory "00011" is the number of an article started to be used on "2017/2/20" (see the reference numeral i in FIG. 5).

FIG. 6 is a graphical (formatted) illustration of the collected information illustrated in FIG. 5. The horizontal axis in FIG. 6 indicates the starting date of use and the vertical axis indicates the cumulative number of introductions of the PKG "A". The formatting in FIG. 6 is performed for each PKG type and the graph in FIG. 6 illustrates the inventories "00001" and "00011."

As illustrated in FIG. 6, the first one of the article corresponding to the PKG type "A" and the inventory "00001" is introduced on the starting date of use "2015/3/1" and the second one is introduced on the starting date of use "2015/3/2". Here, on the graph in FIG. 6, the number of introductions is displayed as the cumulative number of introductions. Thus, the article corresponding to the inventory "00001" is illustrated as a positive correlation diagram with the cumulative number of introductions increasing from the starting date of use "2015/3/1."

Here, with the number of introductions of the PKG "A" expressed using the cumulative number of introductions, the level of influence (range of influence) corresponding to the transmission apparatus 10 of the PKG "A" can be indicated. That is, even if the PKG "A" fails, when the number of introductions of the PKG "A" to the transmission apparatus 10 is small, the influence over the system as a whole is small. The larger the number of introductions of the PKG "A" to the transmission apparatus 10 is, the more influence over the system as a whole there is. With the number of introductions of the PKG "A" expressed using the cumulative number of introductions, the level of influence (range of influence) on the system as a whole can be visualized. Note that when a plurality of PKGs "A" are introduced to a single transmission apparatus 10, all the articles corresponding to the inventories of the plurality of PKGs "A" are cumulated.

On the other hand, as illustrated in FIG. 6 where a plurality of units are introduced, the first one of the article corresponding to the inventory "00011" of the PKG type "A" is introduced on the starting date of use "2017/2/20", the second one is introduced on the starting date of use "2017/2/21", the third one is introduced on the starting date of use "2017/2/25", and so on. Thus, the article corresponding to the inventory "00011" is illustrated as a positive correlation diagram with the cumulative number of introductions increasing starting from the starting date of use "2017/2/20" as in the case of the article corresponding to the inventory "00001".

As indicated by the reference numeral x in FIG. 6, it is assumed that a failure has occurred in the article corresponding to the inventory "00011" of the PKG type "A". Specifically, it is displayed that a failure occurred in articles with the starting dates of use "2017/2/20", "2017/3/1", and "2017/3/7" among the articles corresponding to the inventory "00011" of the PKG type "A".

Then, the information analysis unit 130 (see FIG. 2) of the apparatus management unit 110 notifies the commercial service 3 (carrier) (see FIG. 7) of the graph illustrated in FIG. 6. The commercial service 3 (carrier) can check the article with which inventory has failed by referring to the graph illustrated in FIG. 6.

As described above, the transmission system (see FIG. 1) according to the embodiment includes the apparatus management server 100 configured to manage information about a plurality of articles forming the optical transmission apparatus 10. The apparatus management server 100 includes the collection unit configured to collect the history information on the introduction instance of the articles to the optical transmission apparatus 10, and the information analysis unit 130 (visualization unit) configured to visualize and display, based on the history information collected, a graph in which the starting date of use for each of the articles is associated with the number of introductions of the article.

A failure management method for the apparatus management server 100 includes collecting history information on an introduction instance of articles to the optical transmission apparatus 10 and visualizing and displaying, based on the history information collected, a graph in which the starting date of use for each of the articles is associated with the number of introductions of the article.

In Comparative Example in FIG. 7, multiple failures occur that are associated with a change within the specification value of the component (change from the component a to the component a #). As illustrated in FIG. 7, the commercial service 3 (carrier) is aware of the change in the article, and thus cannot detect a difference between the normal article and the failed article. In addition, identification of the cause by the system vendor 4 requires a long period of time and the range of failure of the commercial service expands.

In contrast, the apparatus management server 100 of the embodiment visualizes and displays a graph in which the starting date of use for each of the articles is associated with the number of introductions of the article based on the history information collected. Specifically, the collected information illustrated in FIG. 5 is visualized by the graph in which the starting date of use for each of the articles is associated with the number of introductions of the article as illustrated in FIG. 6. This allows the commercial service 3 (carrier) to correlate an article with the occurrence of failure associated with a silent change, so that the occurrence of the failure of the article associated with the silent change can be checked on the graph illustrated in FIG. 6. For example, in FIG. 6, it can be easily confirmed that a failure has occurred in the article corresponding to the inventory "00011" with the starting date of use "2017/2/20".

In the commercial service 3 (carrier), information indicating the cause of failure can be collected for swift identification of the cause of the failure associated with a silent change of an article. As a result, the cause of failure associated with a silent change of the article that has occurred can be swiftly identified. The time required for identifying the cause after the identification of the failed portion is considerably reduced, whereby the influence on the commercial service can be reduced especially when multiple failures associated with a silent change of the article occur.

Furthermore, in the embodiment, upon being notified of detection of failure from a failure detection server (not illustrated) and in response to the occurrence of failure of the article, the visualization unit outputs the graph in which a starting date of use for each of the articles is associated with the number of introductions of the article.

This allows the graph to be output in response to an occurrence of the failure of the article so as to prevent overhead due to excessive visualization processing executed with no failure associated with silent change of an article.

Furthermore, in the embodiment, the visualization unit adds a mark indicating the occurrence of a failure of the article to the graph in which the starting date of use for each of the articles is associated with the number of introductions of the article.

This allows the time of occurrence of failure associated with a silent change in the article to be recorded in the graph, whereby the occurrence of failure associated with the silent change in the article can be displayed on the graph in a more easily understandable manner.

In the embodiment, the starting date of use for each article is the date of installation of the article in the transmission apparatus 10.

This enables easy calculation from the starting date of use, whereby the configuration of the transmission system can be simplified. With the configuration of the transmission system simplified, cost reduction can be achieved.

All or some of the processes described as being performed automatically among the processes described in the embodiments may be performed manually, or all or some of the processes described as being performed manually may be performed automatically using a known method. In addition, information including the processing procedures, the control procedures, the specific names, and the various types of data, and various parameters described in the aforementioned document and drawings can be modified as desired except in the case specifically noted. Each element of each apparatus illustrated is a functional concept and does not necessarily need to be physically configured as illustrated. That is, the specific modes of dispersion and integration of the devices are not limited to those illustrated and all or some of the devices can be configured such that they are functionally or physically dispersed or integrated in any units according to various loads, use conditions, or the like.

In addition, each of the configurations, functions, processing units, processing means, and the like described above may be partially or entirely realized in hardware, for example, by designing them in an integrated circuit. Each of the configurations, the functions, and the like may be realized in software for a processor to interpret and execute a program that implements the functions. Information such as a program, a table, and a file for realizing each function can be held in a recording device such as a memory, a hard disk, or a solid state drive (SSD) or a recording medium such as an integrated circuit (IC) card, a secure digital (SD) card, or an optical disc.

REFERENCE SIGNS LIST

10 Optical transmission apparatus (transmission apparatus)
11 Apparatus control unit
12 Article information management unit
13 Apparatus information unit
100 Apparatus management server
110 Apparatus management unit (collection unit)
120 Apparatus information collection unit (collection unit)
130 Information analysis unit (visualization unit)
140 Database (DB) (collection unit)
PKG Package (article)

The invention claimed is:

1. A failure management method for an apparatus management server configured to manage information about a plurality of articles forming a transmission apparatus in a transmission system, the method comprising:
receiving, by the apparatus management server, history information on an introduction instance of the plurality of articles from the transmission apparatus, wherein the transmission apparatus is configured to optically transmit the plurality of articles, and wherein the history information comprises a starting data of use for each of the plurality of articles; and
visualizing and displaying, by the apparatus management server, the history information, in a graph with at least two dimensions in which a starting date of use for each of the plurality of articles is plotted against a cumulative number of introductions of the article up to the starting date.

2. The failure management method of claim 1, wherein the graph in at least two dimensions is configured to show a level of influence to the transmission system in correspondence with a failure associated with a silent change in an article of the plurality of articles.

3. A transmission system comprising an apparatus management server configured to manage information about a plurality of articles forming a transmission apparatus, wherein
the apparatus management server includes:
a collection unit including one or more processors and configured to receive history information on an introduction instance of the plurality of articles from the transmission apparatus, wherein the transmission apparatus is configured to optically transmit the plurality of articles, and wherein the history information comprises a starting data of use for each of the plurality of articles; and
a visualization unit, including one or more processors and a digital display, configured to visualize and display the history information in a graph with at least two dimensions in which a starting date of use for each of the plurality of articles is plotted against a cumulative number of introductions of the article up to the starting date.

4. The transmission system according to claim 3, wherein the graph in at least two dimensions is configured to show a level of influence to the transmission system in correspondence with a failure associated with a silent change in an article of the plurality of articles.

5. The transmission system according to claim 3, wherein
the transmission apparatus holds, as the history information, article information, starting information of use, and inventory used by the transmission apparatus, and
the transmission apparatus transmits the history information to the apparatus management server in response to a request from the apparatus management server.

6. A program, stored on a non-transitory computer medium, causing a computer serving as an apparatus management server of a transmission system, the apparatus management server configured to manage information about a plurality of articles forming a transmission apparatus, to function as
a collection unit including one or more processors and configured to receive history information on an introduction instance of the plurality of articles from the transmission apparatus, wherein the transmission apparatus is configured to optically transmit the plurality of articles, and wherein the history information comprises a starting data of use for each of the plurality of articles; and
a visualization unit, including one or more processors and a digital display, configured to visualize and display the history information in a graph with at least two dimensions in which a starting date of use for each of the plurality of articles is plotted against a cumulative number of introductions of the article up to the starting date.

7. The program of claim 6, wherein the graph in at least two dimensions is configured to show a level of influence to the transmission system in correspondence with a failure associated with a silent change in an article of the plurality of articles.

* * * * *